(12) United States Patent
Yuan et al.

(10) Patent No.: US 11,509,440 B2
(45) Date of Patent: Nov. 22, 2022

(54) METHOD AND APPARATUS FOR INDICATING SYNCHRONIZATION SIGNAL BLOCK GROUP INDICATION INFORMATION WITHIN SYNCHRONIZATION SIGNAL BLOCKS

(71) Applicant: Huawei Technologies Co., Ltd., Shenzhen (CN)

(72) Inventors: Pu Yuan, Shenzhen (CN); Jin Liu, Shenzhen (CN); Zhengzheng Xiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 217 days.

(21) Appl. No.: 16/786,503

(22) Filed: Feb. 10, 2020

(65) Prior Publication Data

US 2020/0177345 A1 Jun. 4, 2020

Related U.S. Application Data

(63) Continuation of application No. PCT/CN2018/095567, filed on Jul. 13, 2018.

(30) Foreign Application Priority Data

Aug. 11, 2017 (CN) .......................... 201710687868.7

(51) Int. Cl.
*H04B 17/382* (2015.01)
*H04L 5/00* (2006.01)
(Continued)

(52) U.S. Cl.
CPC ......... *H04L 5/0053* (2013.01); *H04B 17/382* (2015.01); *H04W 4/08* (2013.01);
(Continued)

(58) Field of Classification Search
CPC ............ H04W 56/00; H04W 56/0005; H04W 56/0025; H04W 74/0891; H04W 56/001; H04W 4/08; H04W 12/76; H04B 17/382
See application file for complete search history.

(56) References Cited

U.S. PATENT DOCUMENTS 9,247,513 B2   1/2016  Dick et al.
2011/0007694 A1  1/2011  Kim et al.
(Continued)

FOREIGN PATENT DOCUMENTS

CN   101480007 A   7/2009
CN   101641970 A   2/2010
(Continued)

OTHER PUBLICATIONS

R1-1702315 , "Consideration on SS Burst Design and Indication", Feb. 13-17, 2017, pp. 1-5 (Year: 2017).*
(Continued)

*Primary Examiner* — Salvador E Rivas
(74) *Attorney, Agent, or Firm* — Slater Matsil, LLP

(57) ABSTRACT

Embodiments of the present invention provide a synchronization signal block indication method, a synchronization signal block determining method, a network device, and a terminal device. The method includes: generating, by a network device, a synchronization signal block indication message, where the synchronization signal block indication message includes synchronization signal block group indication information which is used to indicate an synchronization signal block group sent by the network device, and synchronization signal block indication information is used to indicate an synchronization signal block sent by the network device in each synchronization signal block group, and locations of a synchronization signal block sent by the network device in synchronization signal block groups sent by the network device are the same; and sending, by the
(Continued)

network device, the synchronization signal block indication message.

16 Claims, 4 Drawing Sheets

(51) Int. Cl.
*H04W 48/08* (2009.01)
*H04W 56/00* (2009.01)
*H04W 72/04* (2009.01)
*H04W 12/76* (2021.01)
*H04W 4/08* (2009.01)

(52) U.S. Cl.
CPC .......... *H04W 12/76* (2021.01); *H04W 48/08* (2013.01); *H04W 56/001* (2013.01); *H04W 72/0446* (2013.01)

(56) References Cited

U.S. PATENT DOCUMENTS

| | | | |
|---|---|---|---|
| 2016/0227502 A1 | 8/2016 | Vos et al. | |
| 2017/0013577 A1* | 1/2017 | Berggren | H04B 7/2656 |
| 2020/0067755 A1* | 2/2020 | Pan | H04L 27/2656 |
| 2020/0154376 A1* | 5/2020 | Ko | H04W 72/005 |

FOREIGN PATENT DOCUMENTS

| | | |
|---|---|---|
| CN | 101047428 B | 12/2010 |
| CN | 105659675 A | 6/2016 |
| CN | 106793058 A | 5/2017 |
| CN | 109348535 B | 10/2019 |
| CN | 109067510 B | 11/2019 |
| JP | 4846956 B2 | 12/2011 |
| RU | 2625816 C1 | 7/2017 |
| WO | 2016203290 A1 | 12/2016 |

OTHER PUBLICATIONS

R1-1711645 ,"SS burst set composition consideration", Jun. 27-30, 2017, pp. 1-7 (Year: 2017).*

Huawei et al, "WF on SS-block Index Indication", 3GPP TSG RAN WG1 NR Ad Hoc Meeting, R1-1701530, Jan. 16-20, 2017, 3 pages, Spokane, USA.
Qualcomm Incorporated, SS burst set composition consideration. 3GPP TSG-RAN WG1 Ad-Hoc#2 R1-1711645, Jun. 27-30, 2017, 7 pages, Qingdao, P.R. China.
Fujitsu, "NR-PBCH design", 3GPP TSG RAN WG1 Meeting #89, Apr. 15-19, 2017, R1-1707253, 10 pages, Hangzhou, China.
LG Electronics, "Discussion on SS burst set composition", 3GPP TSG RAN WG1 Meeting NR#2, R1-1710259, Jun. 27-30, 2017, 7 pages, Qingdao, P.R. China.
Intel Corporation, "SS Burst Set Composition", 3GPP TSG RAN WG1 NR Ad-Hoc#2, R1-1710502, Jun. 27-30, 2017, 7 pages, Qingdao, P.R. China.
Sharp, "Indication of actually transmitted SS blocks", 3GPP TSG RAN WG1 NR Ad-Hoc#2 Meeting, R1-1711232, May 27-30, 2017, 4 pages, Qingdao, P.R. China.
Interdigital Inc.; "On SS Block Based Timing Indication in NR", 3GPP TSG RAN WG1 NR AH#2, R1-1710915, Jun. 27-30, 2017, 4 pages, Qingdao, P.R. China.
Huawei et al., "SS Burst Set and Block Composition", 3GPP TSG RAN WG1 NR Ad Hoc Meeting R1-1709912, Jun. 27-30, 2017, 9 pages, Qingdao, China.
Interdigital Communications: "Considerations on SS Burst Design and Indication", 3GPP TSG RAN WG1 Meeting #88, R1-1702315, Feb. 13-17, 2017, 5 pages, Athens, Greece.
Sharp, "SS block and SS burst set composition", 3GPP TSG RAN WG1 #89 Meeting R1-1708367, May 15-19, 2017, 5 pages, Hangzhou, P. R. China.
Nokia, Alcatel-Lucent Shanghai Bell: "SS block time index indication", 3GPP TSG-RAN WG1 Meeting #89 R1-1708233, May 15-19, 2017, 7 pages, Hangzhou, China.
"3rd Generation Partnership Project;Technical Specification Group Radio Access Network; NR;Radio Resource Control (RRC); Protocol specification (Release 15)"; 3GPP TS 38.331 V0.0.4 (Jun. 2017); 22 pages.
NTT Docomo, Inc.:"Discussion on timing indication based on SS block for NR", 3GPP TSG RAN WG1 NR Ad-Hoc#2 R1-1711058, Jun. 27-30, 2017, 11 pages, Qingdao, P.R. China.

* cited by examiner

METHOD AND APPARATUS FOR INDICATING SYNCHRONIZATION SIGNAL BLOCK GROUP INDICATION INFORMATION WITHIN SYNCHRONIZATION SIGNAL BLOCKS

CROSS-REFERENCE TO RELATED APPLICATIONS

This application is a continuation of International Application No. PCT/CN2018/095567, filed on Jul. 13, 2018, which claims priority to Chinese Patent Application No. 201710687868.7, filed on Aug. 11, 2017. The disclosures of the aforementioned applications are hereby incorporated by reference herein in their entireties.

TECHNICAL FIELD

The present invention relates to the field of communications technologies, and in particular, to a synchronization signal block indication method, a synchronization signal block determining method, a network device, and a terminal device.

BACKGROUND

A synchronization signal block is a signal structure defined in New Radio (NR), and includes a primary synchronization signal (PSS), a secondary synchronization signal (SSS), and a physical broadcast channel (PBCH). Main functions of the PSS and the SSS are to help user equipment (UE) to identify a cell and synchronize with the cell. The PBCH includes most basic system information, for example, a system frame number or intra-frame timing information. The UE cannot access the cell unless the UE successfully receives the synchronization signal block.

To support a multi-beam feature of the NR, a synchronization signal burst set (SS burst set) is defined in the NR. The synchronization signal burst set includes one or more synchronization signal blocks. A maximum quantity L of synchronization signal blocks that can be included in the synchronization signal burst set varies in different frequency ranges. Specifically, when a frequency does not exceed 3 GHz, L=4. When the frequency falls between 3 GHz and 6 GHz, L=8. When the frequency falls between 6 GHz and 52.6 GHz, L=64.

In an actual transmission process, a quantity of actually transmitted synchronization signal blocks in a synchronization signal burst set is not always equal to L, and may be less than L. In a timeslot in which no synchronization signal block is transmitted, a base station may send other information or schedule the UE to perform transmission. In this way, the base station needs to notify the UE of the actually transmitted synchronization signal blocks, so that the UE successfully receives the synchronization signal blocks.

SUMMARY

Embodiments of the present invention provide a synchronization signal block indication method, a synchronization signal block determining method, a network device, a terminal device, and a system, to indicate a synchronization signal block sent by a network device, and to help a terminal device successfully receive the synchronization signal block.

According to a first aspect, an embodiment of the present invention provides a synchronization signal block indication method. The method includes:

generating, by a network device, a synchronization signal block indication message, where the synchronization signal block indication message includes synchronization signal block group indication information and synchronization signal block indication information, the synchronization signal block group indication information is used to indicate a synchronization signal block group, the synchronization signal block indication information is used to indicate a synchronization signal block sent by the network device in each synchronization signal block group, and locations of a synchronization signal block in synchronization signal block groups sent by the network device are the same; and sending, by the network device, the synchronization signal block indication message.

According to the synchronization signal block indication method provided in this embodiment of the present invention, the network device indicates the synchronization signal block group sent by the network device and the synchronization signal block sent by the network device in the synchronization signal block group by using the synchronization signal block indication message. Because the locations of a synchronization signal block sent by the network device in the synchronization signal block groups sent by the network device are the same, the network device can indicate all the synchronization signal block(s).

In a possible design, the synchronization signal block group indication information includes quantity information and configuration information of the synchronization signal block group sent by the network device. The quantity information is used to indicate a quantity m of synchronization signal block group(s) sent by the network device. The configuration information is used to indicate whether the synchronization signal block group(s) sent by the network device is the first m synchronization signal block group(s) or the last m synchronization signal block group(s).

The synchronization signal block indication information is bitmap information. The bitmap information is used to indicate the synchronization signal block sent by the network device in each synchronization signal block group sent by the network device.

Optionally, the synchronization signal block group indication information includes the quantity information of the synchronization signal block group sent by the network device. The quantity information is used to indicate the synchronization signal block group sent by the network device. In this case, a configuration rule of the synchronization signal block group sent by the network device is predetermined. For example, the configuration rule may be predefined in a communication protocol. For example, the rule may be that the synchronization signal block group(s) sent by the network device is the first m synchronization signal block group(s), or the synchronization signal block group(s) sent by the network device is the last m synchronization signal block group(s), where m is a quantity of synchronization signal block group(s) sent by the network device. When a value of m is determined, the synchronization signal block group(s) sent by the network device can be determined.

In a possible design, the synchronization signal block group indication information includes quantity information and configuration information of the synchronization signal block group sent by the network device. The quantity information is used to indicate a quantity m of synchronization signal block group(s) sent by the network device. The configuration information is used to indicate whether the synchronization signal block group(s) sent by the network device is the first m synchronization signal block group(s) or the last m synchronization signal block group(s).

The synchronization signal block indication information includes quantity information and configuration information of the synchronization signal block sent by the network device. The quantity information is used to indicate a quantity n of synchronization signal block(s) sent by the network devices in each synchronization signal block group sent by the network device. The configuration information is used to indicate whether the synchronization signal block(s) sent by the network devices in each synchronization signal block group sent by the network device is the first n synchronization signal block(s) or the last n synchronization signal block(s) in the synchronization signal block group.

In a possible design, the synchronization signal block group indication information is bitmap information. The bitmap information is used to indicate the synchronization signal block group sent by the network device.

The synchronization signal block indication information includes quantity information and configuration information of the synchronization signal block sent by the network device. The quantity information is used to indicate a quantity n of synchronization signal block(s) sent by the network device in each synchronization signal block group sent by the network device. The configuration information is used to indicate whether the synchronization signal block sent by the network device(s) in each synchronization signal block group sent by the network device is the first n synchronization signal block(s) or the last n synchronization signal block(s) in the synchronization signal block group.

Optionally, the synchronization signal block indication information includes the quantity information of the synchronization signal block sent by the network device. The quantity information is used to indicate the synchronization signal block sent by the network device in each synchronization signal block group sent by the network device. In this case, a configuration rule of the synchronization signal block is predetermined. For example, the configuration rule may be predefined in a communication protocol. For example, the rule may be that the synchronization signal block(s) sent by the network device in each synchronization signal block group sent by the network device is the first n synchronization signal block(s) or the last n synchronization signal block(s) in the synchronization signal block group, where n is a quantity of synchronization signal block(s) sent by the network device in each synchronization signal block group sent by the network device. When a value of n is determined, the synchronization signal block(s) sent by the network device in each synchronization signal block group sent by the network device can be determined.

In a possible design, the synchronization signal block group indication information is bitmap information. The bitmap information is used to indicate the synchronization signal block group sent by the network device.

The synchronization signal block indication information is bitmap information. The bitmap information is used to indicate the synchronization signal block sent by the network device in each synchronization signal block group sent by the network device.

In a possible design, the synchronization signal block group indication information is carried by using a master information block (MIB), and the synchronization signal block indication information is carried by using remaining system information (RMSI).

Optionally, the synchronization signal block group indication information is carried by using RMSI, and the synchronization signal block indication information is carried by using an MIB.

Optionally, the synchronization signal block group indication information and the synchronization signal block indication information are carried by using an MIB.

Optionally, the synchronization signal block group indication information and the synchronization signal block indication information are carried by using RMSI.

According to a second aspect, an embodiment of the present invention provides a synchronization signal block determining method. The method includes:

receiving, by a terminal device, a synchronization signal block indication message, where the synchronization signal block indication message includes synchronization signal block group indication information and synchronization signal block indication information, the synchronization signal block group indication information is used to indicate a synchronization signal block group sent by a network device, and the synchronization signal block indication information is used to indicate a synchronization signal block sent by the network device in each synchronization signal block group sent by the network device; and determining, by the terminal device based on the synchronization signal block indication message, the synchronization signal block group sent by the network device and the synchronization signal block sent by the network device in each synchronization signal block group sent by the network device.

According to the synchronization signal block determining method provided in this embodiment of the present invention, the terminal device receives the synchronization signal block indication message sent by a network device, and determines, based on the synchronization signal block indication message, the synchronization signal block group sent by the network device and the synchronization signal block sent by the network device in the synchronization signal block group. Because locations of a synchronization signal block sent by the network device in the synchronization signal block groups sent by the network device are the same, the terminal device can determine all the synchronization signal block(s) sent by the network device.

In a possible design, the synchronization signal block group indication information includes quantity information and configuration information of the synchronization signal block group sent by the network device. The quantity information is used to indicate a quantity m of synchronization signal block group(s) sent by the network device. The configuration information is used to indicate whether the synchronization signal block group(s) sent by the network device is the first m synchronization signal block group(s) or the last m synchronization signal block group(s).

The synchronization signal block indication information is bitmap information. The bitmap information is used to indicate the synchronization signal block sent by the network device in each synchronization signal block group sent by the network device. The terminal device determines the synchronization signal block group sent by the network device based on the quantity information and the configuration information, and determines the synchronization signal block sent by the network device in each synchronization signal block group sent by the network device based on the bitmap information, thereby determining all the synchronization signal block(s) sent by the network device.

Optionally, the synchronization signal block indication information includes the quantity information of the synchronization signal block sent by the network device. The quantity information is used to indicate the synchronization signal block sent by the network device in each synchronization signal block group sent by the network device. In this case, a configuration rule of the synchronization signal block is predetermined. For example, the configuration rule may be predefined in a communication protocol. For example, the rule may be that the synchronization signal block(s) sent by the network device in each synchronization signal block group sent by the network device is the first n synchronization signal block(s) or the last n synchronization signal block(s) in the synchronization signal block group, where n is a quantity of synchronization signal block(s) sent by the network device in each synchronization signal block group sent by the network device. When a value of n is determined, the synchronization signal block(s) sent by the network device in each synchronization signal block group sent by the network device can be determined.

In a possible design, the synchronization signal block group indication information includes quantity information and configuration information of the synchronization signal block group sent by the network device. The quantity information is used to indicate a quantity m of synchronization signal block group(s) sent by the network device. The configuration information is used to indicate whether the synchronization signal block group(s) sent by the network device is the first m synchronization signal block group(s) or the last m synchronization signal block group(s).

The synchronization signal block indication information includes quantity information and configuration information of the synchronization signal block sent by the network device. The quantity information is used to indicate a quantity n of synchronization signal block(s) sent by the network device in each synchronization signal block group sent by the network device. The configuration information is used to indicate whether the synchronization signal block(s) sent by the network device in each synchronization signal block group sent by the network device is the first n synchronization signal block(s) or the last n synchronization signal block(s) in the synchronization signal block group. The terminal device determines the synchronization signal block group sent by the network device based on the quantity information and the configuration information of the synchronization signal block group sent by the network device, and determines the synchronization signal block sent by the network device in each synchronization signal block group sent by the network device based on the quantity information and the configuration information of the synchronization signal block sent by the network device, thereby determining all the synchronization signal block(s) sent by the network device.

In a possible design, the synchronization signal block group indication information is bitmap information. The bitmap information is used to indicate the synchronization signal block group sent by the network device.

The synchronization signal block indication information includes quantity information and configuration information of the synchronization signal block sent by the network device. The quantity information is used to indicate a quantity n of synchronization signal block(s) sent by the network device in each synchronization signal block group sent by the network device. The configuration information is used to indicate whether the synchronization signal block(s) sent by the network device in each synchronization signal block group sent by the network device is the first n synchronization signal block(s) or the last n synchronization signal block(s) in the synchronization signal block group. The terminal device determines the synchronization signal block group sent by the network device based on the bitmap information, and determines the synchronization signal block sent by the network device in each synchronization signal block group sent by the network device based on the quantity information and the configuration information, thereby determining all the synchronization signal block(s) sent by the network device.

Optionally, the synchronization signal block indication information includes the quantity information of the synchronization signal block sent by the network device. The quantity information is used to indicate the synchronization signal block sent by the network device in each synchronization signal block group sent by the network device. In this case, a configuration rule of the synchronization signal block is predetermined. For example, the configuration rule may be predefined in a communication protocol. For example, the rule may be that the synchronization signal block(s) sent by the network device in each synchronization signal block group sent by the network device is the first n synchronization signal block(s) or the last n synchronization signal block(s) in the synchronization signal block group, where n is a quantity of synchronization signal block(s) sent by the network device in each synchronization signal block group sent by the network device. When a value of n is determined, the synchronization signal block(s) sent by the network device in each synchronization signal block group sent by the network device can be determined.

In a possible design, the synchronization signal block group indication information is bitmap information. The synchronization signal block group bitmap information is used to indicate the synchronization signal block group sent by the network device.

The synchronization signal block indication information is bitmap information. The synchronization signal block bitmap information is used to indicate the synchronization signal block sent by the network device in each synchronization signal block group sent by the network device. The terminal device determines the synchronization signal block group sent by the network device based on the synchronization signal block group bitmap information, and determines the synchronization signal block sent by the network device in each synchronization signal block group sent by the network device based on the synchronization signal block bitmap information, thereby determining all the synchronization signal block(s) sent by the network device.

In a possible design, the synchronization signal block group indication information is carried by using a master information block MIB, and the synchronization signal block indication information is carried by using remaining system information RMSI.

Optionally, the synchronization signal block group indication information is carried by using RMSI, and the synchronization signal block indication information is carried by using an MIB.

Optionally, the synchronization signal block group indication information and the synchronization signal block indication information are carried by using an MIB.

Optionally, the synchronization signal block group indication information and the synchronization signal block indication information are carried by using RMSI.

According to a third aspect, an embodiment of the present invention provides a network device. The network device has a function of implementing a behavior of the network device in the foregoing method. The function may be implemented by hardware, or may be implemented by hardware executing corresponding software. The hardware or software includes one or more modules corresponding to the foregoing function. Optionally, the network device may be a base station.

According to a fourth aspect, an embodiment of the present invention provides a terminal device. The terminal device has a function of implementing a behavior of the terminal device in the foregoing method. The function may be implemented by hardware, or may be implemented by hardware executing corresponding software. The hardware or software includes one or more modules corresponding to the foregoing function. Optionally, the terminal device may be user equipment.

According to a fifth aspect, an embodiment of the present invention provides a network device. A structure of the network device includes a processor and a transmitter. The processor is configured to support the network device in performing a corresponding function in the foregoing method, for example, generating or processing data and/or information in the foregoing method. The transmitter is configured to support the network device in sending the data, the information, or an instruction in the foregoing method to the terminal device, for example, sending the synchronization signal block indication message. In a possible design, the network device may further include a receiver. The receiver is configured to receive information or an instruction sent by the terminal device. In a possible design, the network device may further include a communications unit. The communications unit is configured to support the network device in communicating with another network side device, for example, receiving information or an instruction sent by a network side device, and/or sending information or an instruction to another network side device. In a possible design, the structure of the network device may further include a memory. The memory is configured to be coupled to the processor, and store a program instruction and data necessary to the network device.

According to a sixth aspect, an embodiment of the present invention provides a terminal device. A structure of the terminal device includes a processor and a receiver. The processor is configured to support the terminal device in performing a corresponding function in the foregoing method, for example, generating or processing data and/or information in the foregoing method. The receiver is configured to support the terminal device in receiving the data and/or information in the foregoing method. In a possible design, the structure of the terminal device may further include a transmitter, configured to send required information or a required instruction to the network device. In a possible design, the terminal device may further include a communications unit. The communications unit is configured to support the terminal device in communicating with another network side device, for example, receiving information or an instruction sent by a network side device, and/or sending information or an instruction to another network side device. In a possible design, the structure of the terminal device may further include a memory. The memory is configured to be coupled to the processor, and store a program instruction and data necessary to the terminal device.

According to a seventh aspect, an embodiment of the present invention provides a communications system. The system includes the network device and the terminal device according to the foregoing aspects.

According to an eighth aspect, this application provides a computer storage medium, configured to store a computer software instruction used by the foregoing network device, including a program designed for executing the foregoing aspect.

According to a ninth aspect, this application provides a computer storage medium, configured to store a computer software instruction used by the foregoing terminal device, including a program designed for executing the foregoing aspect.

According to a tenth aspect, this application provides a chip system. The chip system includes a processor, configured to support a network device in implementing a function according to the foregoing aspect, for example, generating or processing data and/or information in the foregoing method. In a possible design, the chip system further includes a memory. The memory is configured to store a program instruction and data necessary to the network device. The chip system may include a chip, or may include a chip and another discrete device.

According to an eleventh aspect, this application provides a chip system. The chip system includes a processor, configured to support a terminal device in implementing a function according to the foregoing aspect, for example, receiving or processing data and/or information in the foregoing method. In a possible design, the chip system further includes a memory. The memory is configured to store a program instruction and data necessary to the terminal device. The chip system may include a chip, or may include a chip and another discrete device.

According to the synchronization signal block indication method, the synchronization signal block determining method, the network device, the terminal device, and the system provided in embodiments of the present invention, the network device indicates, by using the synchronization signal block indication message, the synchronization signal block group sent by the network device and the synchronization signal block sent by the network device in each synchronization signal block group sent by the network device. Because the locations of the synchronization signal block sent by the network devices in all the synchronization signal block groups sent by the network device are the same, the terminal device may determine, based on the synchronization signal block indication message, all the synchronization signal blocks actually sent by the network device, to successfully receive the synchronization signal blocks.

DETAILED DESCRIPTION OF ILLUSTRATIVE EMBODIMENTS

The following further describes the embodiments of the present invention in detail with reference to the accompany drawings.

Figure 1:
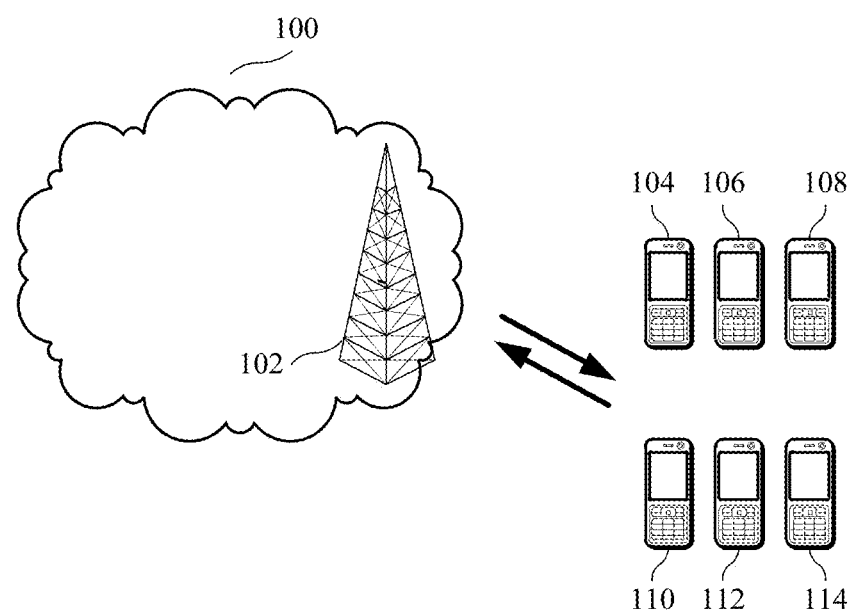
FIG. 1 is a schematic diagram of a system applied in an embodiment of the present invention.

FIG. 1 is a schematic diagram of a system applied in an embodiment of the present invention. As shown in FIG. 1, the system 100 may include a network device 102 and terminal devices 104, 106, 108, 110, 112 and 114. The network device and the terminal devices are connected in a wireless manner. It should be understood that, FIG. 1 is described merely by using an example in which the system includes one network device. However, this embodiment of the present invention is not limited thereto. For example, the system may alternatively include more network devices. Similarly, the system may also include more terminal devices. It should be further understood that the system may also be referred to as a network. This is not limited in this embodiment of the present invention.

The embodiments are described with reference to a terminal device in this specification. The terminal device may refer to user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN), or the like.

As an example rather than a limitation, in this embodiment of the present invention, the terminal device may also be a wearable device. A wearable device may also be referred to as a wearable intelligent device, and is a general term of wearable devices, such as glasses, gloves, watches, clothes, and shoes, that are developed by applying wearable technologies in intelligent designs of daily wear. A wearable device is a portable device that can be directly worn on a body or integrated into clothes or an accessory of a user. A wearable device is not merely a hardware device, but is used to implement a powerful function through software support, data interaction, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bracelets or smart jewelry for monitoring physical signs.

The embodiments are described with reference to a network device in this specification. The network device may be a device for communicating with the terminal device. The network device may be a base transceiver station (BTS) in a Global System for Mobile Communications (GSM) or Code Division Multiple Access (CDMA), or may be a NodeB (NB) in a Wideband Code Division Multiple Access (WCDMA) system, or may be an evolved NodeB (eNB or eNodeB) in a Long Term Evolution (LTE) system, or may be a radio controller in a cloud radio access network (CRAN) scenario. Alternatively, the network device may be a relay node, an access point, an in-vehicle device, a wearable device, a network device in a future 5G network, a network device in a future evolved PLMN network, or the like.

Moreover, in the embodiments of the present invention, the network device provides a service for a cell, and the terminal device communicates with the network device by using a transmission resource (for example, a frequency domain resource or a spectrum resource) used by the cell. The cell may be a cell corresponding to the network device (for example, a base station). The cell may belong to a macro base station, or may belong to a base station corresponding to a small cell. The small cell herein may include: a metro cell, a micro cell, a pico cell, a femto cell, and the like. These small cells have features of small coverage and low transmit power, and are suitable for providing high-speed data transmission services. Moreover, the cell may alternatively be a hypercell.

According to the network device that is used as an example of instead of a limitation to this application, one network device may be divided into one centralized unit (CU) and a plurality of transmission reception points (TRPs)/distributed units (DUs). In other words, a bandwidth based unit (BBU) of the network device is reconstructed into a DU and CU functional entity. It should be noted that forms and quantities of centralized units and TRPs/DUs do not constitute a limitation on the embodiments of the present invention.

The CU can process a wireless high-layer protocol stack function, such as a Radio Resource Control (RRC) layer or a Packet Data Convergence Protocol (PDCP) layer, and even can support some core network functions in sinking to an access network. The access network is termed as an edge computing network, and can meet higher network delay requirements of a future communications network for emerging services such as video, online shopping, and virtual/augmented reality.

The DU may mainly process a physical layer function and a layer 2 function with a higher real-time requirement. Considering a radio remote unit (RRU) and a transmission resource of the DU, some physical layer functions of the DU may be moved up to the RRU, with miniaturization of the RRU, and even more radically, the DU may be combined with the RRU.

The CU may be deployed in a centralized manner. DU deployment depends on an actual network environment. In a core urban area with high traffic density and small station spacing, in a region with limited computer room resources, such as a university or a large-scale performance venue, the DU may also be deployed in a centralized manner. In an area with sparse traffic and relatively large station spacing, such as a suburban county or a mountainous area, the DU may be deployed in a distributed manner.

In the embodiments of the present invention, a synchronization signal block (SS block, SSB) is a signal structure defined in an NR wireless network. The following briefly describes the synchronization signal block with reference to FIG. 2.

Figure 2:
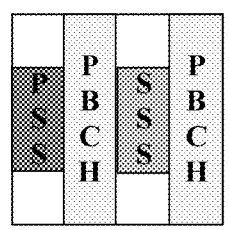
FIG. 2 is a schematic structural diagram of a synchronization signal block according to an embodiment of the present invention.

As shown in FIG. 2, each synchronization signal block includes a primary synchronization signal (PSS) of one orthogonal frequency division multiplexing (OFDM) symbol, a secondary synchronization signal (SSS) of one symbol, and a physical broadcast channel (PBCH) of two symbols. Locations of the PSS, the SSS, and the PBCH in the synchronization signal block are shown in FIG. 2. A sequence length of the PSS/SSS is 127, occupying 127 subcarriers (SCs) in frequency domain. The PBCH occupies 288 subcarriers in frequency domain.

It should be understood that, in various embodiments of the present invention, a symbol and a subcarrier respectively represent a granularity unit, in time domain and in frequency domain, of a time-frequency resource for transmitting a signal, and may have meanings in a current communications system, or may have meanings in a future communications system. Moreover, if names of the symbol and the subcarrier in the future communications system change, the symbol and the subcarrier may also be changed to the name in the future communications system.

In various embodiments of the present invention, a synchronization signal block group may also be referred to as a synchronization signal burst (SS burst). If a name of the synchronization signal block group in the future communications system changes, the synchronization signal block group may also be changed to the name in the future communications system.

In various embodiments of the present invention, a maximum quantity of synchronization signal block(s) that can be sent by the network device in a transmission period of a synchronization signal is a determined value. In other words, a maximum quantity of synchronization signal block(s) included in a synchronization signal burst set is determined. For brevity, the maximum quantity of synchronization signal block(s) included in the synchronization signal burst set is denoted by L. For example, when a frequency falls between 6 GHz and 52.6 GHz, L=64. In an actual communication process, a quantity of synchronization signal blocks sent by the network device may be less than the maximum quantity, for example, less than 64. The network device may transmit other data by using a time-frequency resource that is not used for transmitting a synchronization signal block, or schedule the terminal device to perform transmission. When the quantity of synchronization signal block(s) sent by the network device is less than the maximum quantity, the network device needs to notify the terminal device of synchronization signal block(s) sent by the network device, so that the terminal device can receive the synchronization signal block(s) on an accurate time-frequency resource.

In various embodiments of the present invention, the network device indicates the synchronization signal block(s) sent by the network device based on synchronization signal block group(s). The following briefly describes possible grouping manners of synchronization signal blocks. For example, a synchronization signal block burst set includes a maximum quantity L, being 64, of synchronization signal blocks.

Manner 1: The 64 synchronization signal blocks are divided into 16 synchronization signal block groups. Each synchronization signal block group includes four synchronization signal blocks. Sequence numbers of the 16 synchronization signal block groups are sequentially 0 to 15, and may be represented by using 4-bit information. Sequence numbers of the four synchronization signal blocks included in each synchronization signal block group are sequentially 0 to 3, and may be represented by using 2-bit information.

Manner 2: The 64 synchronization signal blocks are divided into eight synchronization signal block groups. Each synchronization signal block group includes eight synchronization signal blocks. Sequence numbers of the eight synchronization signal block groups are sequentially 0 to 7, and may be represented by using 3-bit information. Sequence numbers of the eight synchronization signal blocks included in each synchronization signal block group are sequentially 0 to 7, and may be represented by using 3-bit information.

Manner 3: The 64 synchronization signal blocks are divided into four synchronization signal block groups. Each synchronization signal block group includes 16 synchronization signal blocks. Sequence numbers of the four synchronization signal block groups are sequentially 0 to 3, and may be represented by using 2-bit information. Sequence numbers of the 16 synchronization signal blocks included in each synchronization signal block group are sequentially 0 to 15, and may be represented by using 4-bit information.

It should be noted that the foregoing grouping manners are examples. Based on the foregoing grouping principle, there may be another grouping manner. For example, the 64 synchronization signal blocks are divided into 32 groups. Moreover, a sequence number of each synchronization signal block in the synchronization signal block burst set may be determined based on a sequence number of a synchronization signal block group to which the synchronization signal block belongs and a sequence number of the synchronization signal block in the synchronization signal block group. Using the foregoing grouping manner 2 as an example, a sequence number of the synchronization signal block group 1 may be represented as 001, and a sequence number of the synchronization signal block 2 in the synchronization signal block group 1 may be represented as 010. In this case, a sequence number of the synchronization signal block 2 in the synchronization signal block group 1 is 001010 (a binary value of the sequence number of the synchronization signal block group is used as a higher order, and a binary value of the sequence number of the synchronization signal block is used as a lower order) in the synchronization signal burst. In other words, the sequence number of the synchronization signal block 2 in the synchronization signal block group 1 is 10 in the synchronization signal burst set. For another example, a sequence number of the synchronization signal block group 7 may be represented as 111, and a sequence number of the synchronization signal block 2 in the synchronization signal block group 7 may be represented as 010. In this case, a sequence number of the synchronization signal block 2 in the synchronization signal block group 7 is 111010 in the synchronization signal burst set. In other words, the sequence number of the synchronization signal block 2 in the synchronization signal block group 7 is 58 in the synchronization signal burst set. In other words, a higher order in a binary value of the sequence number of each synchronization signal block in the synchronization signal block burst set is a binary value of the sequence number of the synchronization signal block group to which the synchronization signal block belongs, and a lower order in the binary value of the sequence number of each synchronization signal block in the synchronization signal block burst set is a binary value of the sequence number of the synchronization signal block in the synchronization signal block group.

In various embodiments of the present invention, locations of a synchronization signal block sent by the network device in synchronization signal block groups sent by the network device are the same. Herein, that the locations are the same may also mean that sequence numbers of the synchronization signal block in the synchronization signal block groups sent by the network device are the same. Using the foregoing grouping manner 3 as an example, sequence numbers of synchronization signal blocks sent by the network device in the synchronization signal block group 0 are 0, 1, 2, and 3, and sequence numbers of synchronization signal blocks sent by the network device in the synchronization signal block group 1 are 0, 1, 2, and 3. In this case, locations of a synchronization signal block sent by the network device in the two synchronization signal block groups are the same. In other words, the synchronization signal blocks sent by the network device in each of the two synchronization signal block groups are the first four synchronization signal blocks in the sent synchronization signal block group. For another example, sequence numbers of synchronization signal blocks sent by the network device in the synchronization signal block group 0 are 0, 2, 4, and 6, and sequence numbers of synchronization signal blocks sent by the network device in the synchronization signal block group 1 are 0, 2, 4, and 6. In this case, locations of a synchronization signal block sent by the network device in the two synchronization signal block groups are also the same. It may be understood that the sequence numbers of the synchronization signal blocks sent by the network device in each synchronization signal block group sent by the network device may be consecutive or may be non-consecutive.

The following describes in detail a synchronization signal block indication method provided in the embodiments of the present invention with reference to the accompanying drawings.

Figure 3:
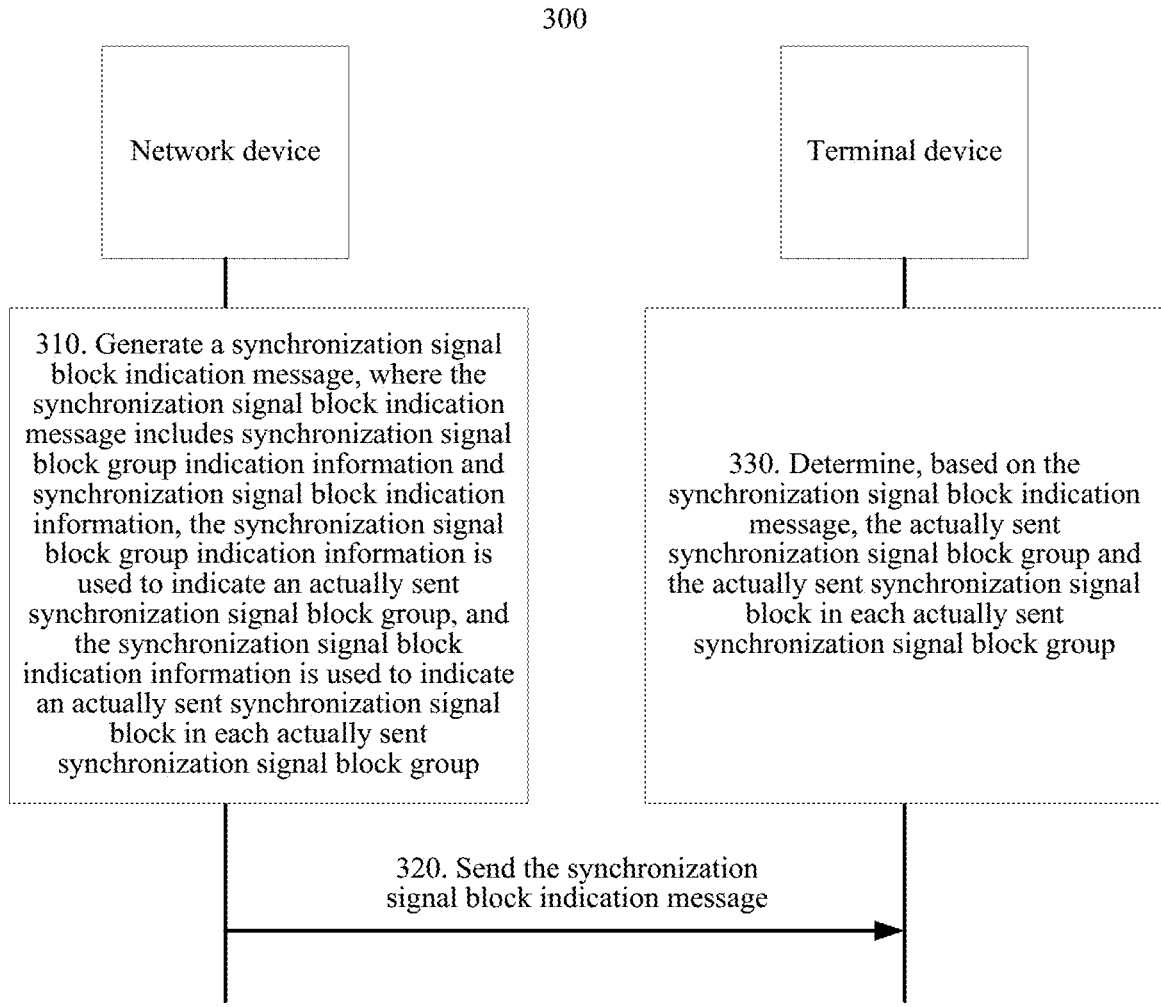
FIG. 3 is a schematic interaction flowchart of a synchronization signal block indication method according to an embodiment of the present invention.

FIG. 3 is a schematic interaction flowchart of a synchronization signal block indication method 300 according to an embodiment of the present invention. A network device in FIG. 3 may be the network device 102 in the system shown in FIG. 1. The terminal device may be the terminal devices 104, 106, 108, 110, 112, and 114 in the system shown in FIG. 1. In a specific implementation process, quantities of network devices and terminal devices may not be limited to examples in this embodiment and another embodiment. No further details are provided below.

310. The network device generates a synchronization signal block indication message, where the synchronization signal block indication message includes synchronization signal block group indication information and synchronization signal block indication information, the synchronization signal block group indication information is used to indicate a synchronization signal block group sent by the network device, the synchronization signal block indication information is used to indicate a synchronization signal block sent by the network device in each synchronization signal block group sent by the network device, and locations of a synchronization signal block sent by the network device in synchronization signal block groups sent by the network device are the same.

In a possible design, the synchronization signal block group indication information includes quantity information and configuration information of the synchronization signal block group sent by the network device. The quantity information is used to indicate a quantity m of synchronization signal block group(s) sent by the network device. The configuration information is used to indicate whether the synchronization signal block group(s) sent by the network device is the first m synchronization signal block group(s) or the last m synchronization signal block group(s) of all synchronization signal block groups. Correspondingly, the synchronization signal block indication information may be bitmap information. The bitmap information is used to indicate the synchronization signal block sent by the network device in each synchronization signal block group sent by the network device. In a specific implementation process, because the locations of the synchronization signal block sent by the network device in the synchronization signal block groups sent by the network device are the same, the network device may indicate the synchronization signal block group sent by the network device by using the quantity information and the configuration information of the synchronization signal block group, and indicate, by using synchronization signal block bitmap information, the synchronization signal block sent by the network device in each synchronization signal block group sent by the network device, thereby indicating, to the terminal device, all synchronization signal block(s) sent by the network device. Using the grouping manner 2 described above as an example, the quantity information of the synchronization signal block group may be 3-bit information, for example, may be 100, and an example of the configuration information of the synchronization signal block group may be described by using Table 1, and may be 1-bit information, for example, may be 0. In this case, a quantity of synchronization signal block groups sent by the network device is four, and the four synchronization signal block groups are the first four synchronization signal block groups, namely, synchronization signal block groups 0, 1, 2, and 3, of all synchronization signal block groups. Correspondingly, the synchronization signal block bitmap information may be a bit sequence. The bit sequence has a length that is equal to a quantity of synchronization signal block(s) in each synchronization signal block group, and each bit in the bit sequence corresponds to one synchronization signal block. If a value of the bit is 1, it indicates that the corresponding synchronization signal block is sent. If the value of the bit is 0, it indicates that the corresponding synchronization signal block is not sent. Specifically, the synchronization signal block bitmap information may be an 8-bit sequence, for example, may be 10100000. In this case, the synchronization signal blocks sent by the network device in each synchronization signal block group sent by the network device are the first synchronization signal block and the third synchronization signal block, namely, a synchronization signal block 0 and a synchronization signal block 2. It may be understood that, when quantity information and configuration information of synchronization signal block group sent by the network device received by the terminal device are respectively 100 and 0, and the synchronization signal block bitmap information is 10100000, the terminal device may determine that synchronization signal block groups sent by the network device are the first four synchronization signal block groups, namely, synchronization signal block groups 0, 1, 2, and 3, of all synchronization signal block groups. Synchronization signal blocks sent by the network device in each synchronization signal block group sent by the network device are the first synchronization signal block and the third synchronization signal block, namely, a synchronization signal block 0 and the synchronization signal block 2. It should be noted that, the quantity of synchronization signal block group(s) may not be in a one-to-one correspondence to the binary value corresponding to bit information. For example, in the foregoing example, when 3-bit information is 000, a corresponding quantity of synchronization signal block groups may be eight. In other words, all synchronization signal block groups are sent. A correspondence between the quantity of synchronization signal block group(s) and the binary value corresponding to the bit information may be determined depending on an actual need. This is not limited herein.

It should be noted that in this case, when different synchronization signal block grouping manners are used, overheads of the network device for indicating the synchronization signal block(s) sent by the network device are different. Details are as follows. The grouping manners are the same as the grouping manners described above.

Manner 1: Indication of the quantity information by the network device needs 4 bits, indication of the configuration information needs 1 bit, and indication of the bitmap information needs 4 bits. In such a grouping manner, the overheads of the network device for indicating the synchronization signal blocks sent by the network device are 9 bits.

Manner 2: Indication of the quantity information by the network device needs 3 bits, indication of the configuration information needs 1 bit, and indication of the bitmap information needs 8 bits. In such a grouping manner, the overheads of the network device for indicating the synchronization signal blocks sent by the network device are 12 bits.

Manner 3: Indication of the quantity information by the network device needs 2 bits, indication of the configuration information needs 1 bit, and indication of the bitmap information needs 16 bits. In such a grouping manner, the overheads of the network device for indicating the synchronization signal blocks sent by the network device are 19 bits.

TABLE 1

| | |
|---|---|
| 0 | Send the first m synchronization signal block groups |
| 1 | Send the last m synchronization signal block groups |

Optionally, the synchronization signal block group indication information includes the quantity information of the synchronization signal block group sent by the network device. The quantity information is used to indicate the synchronization signal block group sent by the network device. In this case, a configuration rule of the synchronization signal block group sent by the network device is predetermined. For example, the configuration rule may be predefined in a communication protocol. For example, the rule may be that the synchronization signal block group(s) sent by the network device is the first m synchronization signal block group(s), or the synchronization signal block group(s) sent by the network device is the last m synchronization signal block group(s), where m is a quantity of synchronization signal block group(s) sent by the network device. When a value of m is determined, the synchronization signal block group(s) sent by the network device can be determined.

In a possible design, the synchronization signal block group indication information includes quantity information and configuration information of the synchronization signal block group sent by the network device. The quantity information is used to indicate a quantity m of synchronization signal block group(s) sent by the network device. The configuration information is used to indicate whether the synchronization signal block group(s) sent by the network device is the first m synchronization signal block group(s) or the last m synchronization signal block group(s) of all synchronization signal block group(s). Correspondingly, the synchronization signal block indication information includes quantity information and configuration information of the synchronization signal block sent by the network device. The quantity information is used to indicate a quantity n of synchronization signal block(s) sent by the network device in each synchronization signal block group sent by the network device. The configuration information is used to indicate whether the synchronization signal block(s) sent by the network device in each synchronization signal block group sent by the network device is the first n synchronization signal block(s) or the last n synchronization signal block(s) in the synchronization signal block group. Different from the foregoing first possible design, in this case, the synchronization signal block(s) sent by the network device in each synchronization signal block group sent by the network device is indicated by using the quantity information and the configuration information. Using the grouping manner 2 described above as an example, the quantity information of the synchronization signal block group may be 3-bit information, for example, may be 100, and an example of the configuration information of the synchronization signal block group may be described by using Table 1, and may be 1-bit information, for example, may be 1. In this case, the quantity information of the synchronization signal block may be 3-bit-information, for example, may be 010, and an example of the configuration information of the synchronization signal block may be described by using Table 2, and may be 1-bit information, for example, may be 0. In this case, a quantity of synchronization signal block groups sent by the network device is four, and the four synchronization signal block groups are the last four synchronization signal block groups, namely, synchronization signal block group 4, 5, 6, and 7, of all synchronization signal block groups. A quantity of synchronization signal block sent by the network devices in each synchronization signal block group sent by the network device is two, and the two synchronization signal blocks are the first two synchronization signal blocks, namely, a synchronization signal block 0 and a synchronization signal block 1, in the synchronization signal block group. It may be understood that, when the quantity information and the configuration information of the synchronization signal block groups sent by the network device received by the terminal device are respectively 100 and 1, and the quantity information and the configuration information of the synchronization signal block sent by the network device are respectively 010 and 0, the terminal device may determine that synchronization signal block groups sent by the network device are the last four synchronization signal block groups, namely, synchronization signal block groups 4, 5, 6, and 7, of all the synchronization signal block groups, a quantity of synchronization signal blocks sent by the network device in each synchronization signal block group sent by the network device is two, and the two synchronization signal blocks are the first two synchronization signal blocks, namely, the synchronization signal block 0 and the synchronization signal block 1, in the synchronization signal block group. It should be noted that, the quantity of synchronization signal block group may not be in a one-to-one correspondence to the binary value corresponding to bit information. For example, in the foregoing example, when 3-bit information is 000, a corresponding quantity of synchronization signal block groups may be eight. In other words, all synchronization signal block groups are sent. A correspondence between the quantity of synchronization signal block group(s) and the binary value corresponding to the bit information may be determined depending on an actual need. This is not limited herein. Similarly, the quantity of synchronization signal block(s) may not be in a one-to-one correspondence to the binary value corresponding to bit information. For example, in the foregoing example, when 3-bit information is 000, a corresponding quantity of synchronization signal blocks may be eight. In other words, all the synchronization signal blocks in the synchronization signal block groups sent by the network device are sent. A correspondence between the quantity of synchronization signal block(s) and the binary value corresponding to the bit information may also be determined depending on an actual need. This is not limited herein.

It should be noted that in this case, when different synchronization signal block grouping manners are used, overheads of the network device for indicating the synchronization signal block sent by the network device are different. Details are as follows. The grouping manners are the same as the grouping manners described above.

Manner 1: Indication of the quantity information of the synchronization signal block group sent by the network device by the network device needs 4 bits, and indication of the configuration information needs 1 bit. Indication of the quantity information of the synchronization signal block sent by the network device in each synchronization signal block group sent by the network device needs 2 bits, and indication of the configuration information needs 1 bit. In such a grouping manner, the overheads of the network device for indicating the synchronization signal block sent by the network device are 8 bits.

Manner 2: Indication of the quantity information of the synchronization signal block group sent by the network device by the network device needs 3 bits, and indication of the configuration information needs 1 bit. Indication of the quantity information of the synchronization signal block sent by the network device in each synchronization signal block group sent by the network device needs 3 bits, and indication of the configuration information needs 1 bit. In such a grouping manner, the overheads of the network device for indicating the synchronization signal block sent by the network device are 8 bits.

Manner 3: Indication of the quantity information of the synchronization signal block group sent by the network device by the network device needs 2 bits, and indication of the configuration information needs 1 bit. Indication of the quantity information of the synchronization signal block sent by the network device in each synchronization signal block group sent by the network device needs 4 bits, and indication of the configuration information needs 1 bit. In such a grouping manner, the overheads of the network device for indicating the synchronization signal block sent by the network device are 8 bits.

TABLE 2

| | |
|---|---|
| 0 | Send the first n synchronization signal blocks |
| 1 | Send the last n synchronization signal blocks |

In a possible design, the synchronization signal block group indication information is bitmap information. The synchronization signal block group bitmap information is used to indicate the synchronization signal block group sent by the network device. Correspondingly, the synchronization signal block indication information may also be bitmap information. The synchronization signal block bitmap information is used to indicate the synchronization signal block sent by the network device in each synchronization signal block group sent by the network device. Using the grouping manner 2 described above as an example, the synchronization signal block group bitmap information may be a bit sequence. The bit sequence has a length that is equal to a quantity of synchronization signal block group(s), and each bit in the bit sequence corresponds to one synchronization signal block group. If a value of the bit is 1, it indicates that the corresponding synchronization signal block group is sent. If the value of the bit is 0, it indicates that the corresponding synchronization signal block group is not sent. Specifically, the synchronization signal block group bitmap information may be an 8-bit sequence, for example, may be 10100000. In this case, the synchronization signal block groups sent by the network device are the first synchronization signal block group and the third synchronization signal block group, namely, a synchronization signal block group 0 and a synchronization signal block group 2. Similar to the synchronization signal block group bitmap information, the synchronization signal block bitmap information may also be an 8-bit sequence, for example, may be 11000000. In this case, the synchronization signal block sent by the network devices in each synchronization signal block group sent by the network device are the first synchronization signal block and the second synchronization signal block, namely, a synchronization signal block 0 and a synchronization signal block 1. It may be understood that, when bitmap information of synchronization signal block groups sent by the network device received by the terminal device is 10100000, and bitmap information of synchronization signal blocks sent by the network device is 11000000, the terminal device may determine that synchronization signal block groups sent by the network device are the first synchronization signal block group and the third synchronization signal block group, namely, the synchronization signal block group 0 and the synchronization signal block group 2, and the synchronization signal blocks sent by the network device in each synchronization signal block group sent by the network device are the first synchronization signal block and the second synchronization signal block, namely, the synchronization signal block 0 and the synchronization signal block 1.

It should be noted that in this case, when different synchronization signal block grouping manners are used, overheads of the network device for indicating the synchronization signal block sent by the network device may be different. Details are as follows. The grouping manners are the same as the grouping manners described above.

Manner 1: Indication of the synchronization signal block group bitmap information by the network device needs 16 bits, and indication of the synchronization signal block bitmap information needs 4 bits. In such a grouping manner, the overheads of the network device for indicating the synchronization signal block sent by the network device are 20 bits.

Manner 2: Indication of the synchronization signal block group bitmap information by the network device needs 8 bits, and indication of the synchronization signal block bitmap information needs 8 bits. In such a grouping manner, the overheads of the network device for indicating the synchronization signal block sent by the network device are 16 bits.

Manner 3: Indication of the synchronization signal block group bitmap information by the network device needs 4 bits, and indication of the synchronization signal block bitmap information needs 16 bits. In such a grouping manner, the overheads of the network device for indicating the synchronization signal block sent by the network device are 20 bits.

In a possible design, the synchronization signal block group indication information is bitmap information. The synchronization signal block group bitmap information is used to indicate the synchronization signal block group sent by the network device. Correspondingly, the synchronization signal block indication information includes quantity information and configuration information of the synchronization signal block sent by the network device. The quantity information is used to indicate a quantity n of synchronization signal block(s) sent by the network device in each synchronization signal block group sent by the network device. The configuration information is used to indicate whether the synchronization signal block(s) sent by the network device in each synchronization signal block group sent by the network device is the first n synchronization signal block(s) or the last n synchronization signal block(s) in the synchronization signal block group. Using the grouping manner 2 described above as an example, the synchronization signal block group bitmap information may be a bit sequence. The bit sequence has a length that is equal to a quantity of synchronization signal block group(s), and each bit in the bit sequence corresponds to one synchronization signal block group. If a value of the bit is 1, it indicates that the corresponding synchronization signal block group is sent. If the value of the bit is 0, it indicates that the corresponding synchronization signal block group is not sent. Specifically, the synchronization signal block group bitmap information may be an 8-bit sequence, for example, may be 11000000. In this case, the quantity information of the synchronization signal block sent by the network device may be 3-bit information, for example, may be 010, and an example of the configuration information of the synchronization signal block may be described by using Table 2, and may be 1-bit information, for example, may be 1. In this case, synchronization signal block groups sent by the network device are the first synchronization signal block group and the second synchronization signal block group, namely, a synchronization signal block group 0 and a synchronization signal block group 1. A quantity of synchronization signal blocks sent by the network device in each synchronization signal block group sent by the network device is two, and the two synchronization signal blocks are the last two synchronization signal blocks, namely, a synchronization signal block 6 and a synchronization signal block 7, in the synchronization signal block group. It may be understood that, when the bitmap information of the synchronization signal block groups received by the terminal device is 11000000, the quantity information of the synchronization signal blocks is 010, and the configuration information of the synchronization signal blocks is 1, the terminal device may determine that synchronization signal block groups sent by the network device are the first synchronization signal block group and the second synchronization signal block group, namely, a synchronization signal block group 0 and a synchronization signal block group 1, the quantity of synchronization signal blocks sent by the network device in each synchronization signal block group sent by the network device is two, and the two synchronization signal blocks are the last two synchronization signal blocks, namely, a synchronization signal block 6 and a synchronization signal block 7, in the synchronization signal block group. It should be noted that, the quantity of synchronization signal block(s) may not be in a one-to-one correspondence to the binary value corresponding to bit information. For example, in the foregoing example, when 3-bit information is 000, a corresponding quantity of synchronization signal blocks may be eight. In other words, all the synchronization signal blocks in the synchronization signal block groups sent by the network device are sent. A correspondence between the quantity of synchronization signal blocks and the binary value corresponding to the bit information may be determined depending on an actual need. This is not limited herein.

It should be noted that in this case, when different synchronization signal block grouping manners are used, overheads of the network device for indicating the synchronization signal block sent by the network device may be different. Details are as follows. The grouping manners are the same as the grouping manners described above.

Manner 1: Indication of the bitmap information of the synchronization signal block group(s) by the network device needs 16 bits, indication of the quantity information of the synchronization signal block sent by the network device in each synchronization signal block group sent by the network device needs 2 bits, and indication of the configuration information needs 1 bit. In such a grouping manner, the overheads of the network device for indicating the synchronization signal block sent by the network device are 19 bits.

Manner 2: Indication of the bitmap information of the synchronization signal block group(s) by the network device needs 8 bits, indication of the quantity information of the synchronization signal block sent by the network device in each synchronization signal block group sent by the network device needs 3 bits, and indication of the configuration information needs 1 bit. In such a grouping manner, the overheads of the network device for indicating the synchronization signal block sent by the network devices are 12 bits.

Manner 3: Indication of the bitmap information of the synchronization signal block group(s) by the network device needs 4 bits, indication of the quantity information of the synchronization signal block sent by the network device in each synchronization signal block group sent by the network device needs 4 bits, and indication of the configuration information needs 1 bit. In such a grouping manner, the overheads of the network device for indicating the synchronization signal block sent by the network devices are 9 bits.

Optionally, the synchronization signal block indication information includes the quantity information of the synchronization signal block sent by the network device. The quantity information is used to indicate the synchronization signal block sent by the network device in each synchronization signal block group sent by the network device. In this case, a configuration rule of the synchronization signal block is predetermined. For example, the configuration rule may be predefined in a communication protocol. For example, the rule may be that the synchronization signal block(s) sent by the network device in each synchronization signal block group sent by the network device is the first n synchronization signal block(s) or the last n synchronization signal block(s) in the synchronization signal block group, where n is a quantity of synchronization signal block(s) sent by the network device in each synchronization signal block group sent by the network device. When a value of n is determined, the synchronization signal block(s) sent by the network device in each synchronization signal block group sent by the network device can be determined.

320. The network device sends the synchronization signal block indication message.

The network device sends the synchronization signal block indication message. The synchronization signal block indication message includes the synchronization signal block group indication information and the synchronization signal block indication information.

In a possible design, the synchronization signal block group indication information is carried by using an MIB, and the synchronization signal block indication information is carried by using RMSI. Using the foregoing grouping manner 2 as an example, when the synchronization signal block group indication information is bitmap information, and the synchronization signal block indication information is also bitmap information, the 8-bit synchronization signal block group indication information is carried by using an MIB, and the 8-bit synchronization signal block indication information is carried by using RMSI.

Optionally, the synchronization signal block group indication information is carried by using RMSI, and the synchronization signal block indication information is carried by using an MIB.

Using the foregoing grouping manner 2 as an example, when the synchronization signal block group indication information is bitmap information, and the synchronization signal block indication information is quantity information and configuration information, the 8-bit synchronization signal block group indication information is carried by using RMSI, and the 4-bit synchronization signal block indication information is carried by using an MIB.

Optionally, the synchronization signal block group indication information and the synchronization signal block indication information are both carried by using MIB.

Optionally, the synchronization signal block group indication information and the synchronization signal block indication information are carried by using RMSI.

330. The terminal device determines, based on the synchronization signal block indication message, the synchronization signal block group sent by the network device and the synchronization signal block sent by the network device in each synchronization signal block group sent by the network device.

After receiving the synchronization signal block indication message sent by the network device, the terminal device determines, based on the synchronization signal block indication message, the synchronization signal block group sent by the network device and the synchronization signal block sent by the network device in each synchronization signal block group sent by the network device. In the specific implementation process, the terminal device may specifically determine, by parsing the synchronization signal block indication message, the synchronization signal block group sent by the network device and the synchronization signal block sent by the network device in each synchronization signal block group sent by the network device. The specific implementation process is already described in detail in step 310. Details are not described herein again.

It can be learned that the network device indicates, by using the synchronization signal block indication message, the synchronization signal block group sent by the network device and the synchronization signal block sent by the network device in each synchronization signal block group sent by the network device. Because the locations of a synchronization signal block sent by the network device in synchronization signal block groups sent by the network device are the same, the terminal device may determine, based on the synchronization signal block indication message, all the synchronization signal block(s) sent by the network device, to successfully receive the synchronization signal block(s).

Figure 4:
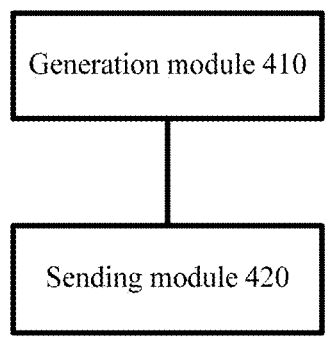
FIG. 4 is a schematic logical structural diagram of a network device according to an embodiment of the present invention.

FIG. 4 is a schematic logical structural diagram of a network device 400 according to an embodiment of the present invention. In a specific implementation process, the network device may be, for example, but is not limited to, the network device 102 in FIG. 1. As shown in FIG. 4, the network device includes a generation module 410 and a sending module 420.

The generation module 410 is configured to generate a synchronization signal block indication message. The synchronization signal block indication message includes synchronization signal block group indication information and synchronization signal block indication information. The synchronization signal block group indication information is used to indicate a synchronization signal block group sent by the network device. The synchronization signal block indication information is used to indicate a synchronization signal block sent by the network device in each synchronization signal block group sent by the network device. Locations of a synchronization signal block sent by the network device in synchronization signal block groups sent by the network device are the same.

The sending module 420 is configured to send the synchronization signal block indication message.

Technical features related to the network device 400 are described in detail above with reference to the accompanying drawings, for example, but not limited to, FIG. 3 and the method 300. Therefore, details are not described herein again.

Figure 5:
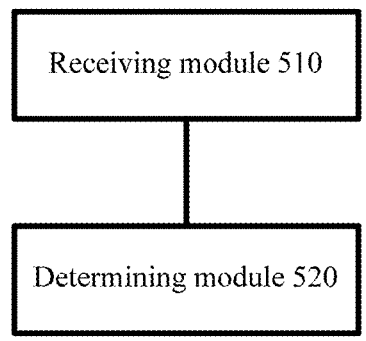
FIG. 5 is a schematic logical structural diagram of a terminal device according to an embodiment of the present invention.

FIG. 5 is a schematic logical structural diagram of a terminal device 500 according to an embodiment of the present invention. In a specific implementation process, the terminal device may be, for example, but is not limited to, the network devices 104, 106, 108, 110, 112 and 114 in FIG. 1. As shown in FIG. 5, the terminal device 500 includes a receiving module 510 and a determining module 520.

The receiving module 510 is configured to receive a synchronization signal block indication message. The synchronization signal block indication message includes synchronization signal block group indication information and synchronization signal block indication information. The synchronization signal block group indication information is used to indicate a synchronization signal block group sent by the network device. The synchronization signal block indication information is used to indicate a synchronization signal block sent by the network device in each synchronization signal block group sent by the network device. Locations of synchronization signal block sent by the network devices in synchronization signal block groups sent by the network device are the same.

The determining module 520 is configured to determine, based on the synchronization signal block indication message, the synchronization signal block group sent by the network device and the synchronization signal block sent by the network device in each synchronization signal block group sent by the network device.

Technical features related to the terminal device 500 are described in detail above with reference to the accompanying drawings, for example, but not limited to, FIG. 3 and the method 300. Therefore, details are not described herein again.

Figure 6:
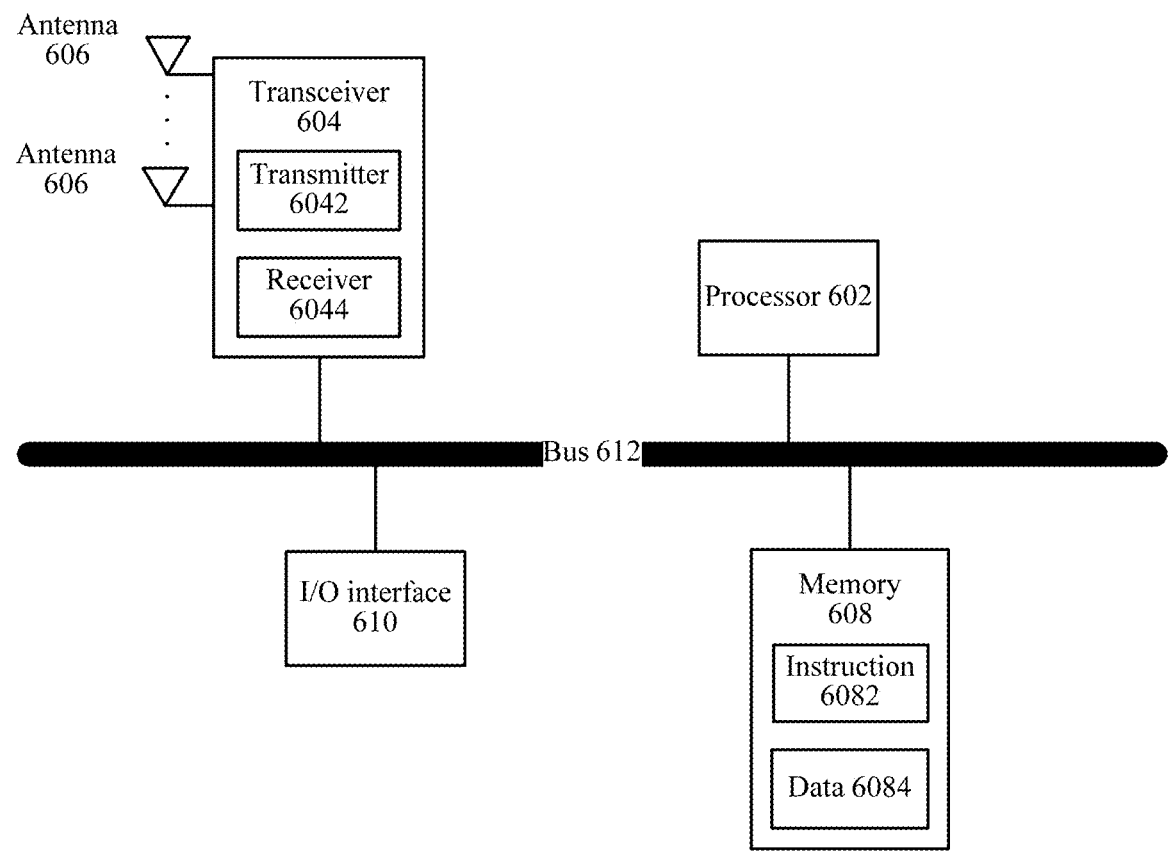
FIG. 6 is a schematic structural hardware diagram of a network device according to an embodiment of the present invention.

FIG. 6 is a schematic structural hardware diagram of a network device 600 according to an embodiment of the present invention. As shown in FIG. 6, the network device 600 includes a processor 602, a transceiver 604, a plurality of antennas 606, a memory 608, an input/output (I/O) interface 610, and a bus 612. The transceiver 604 further includes a transmitter 6042 and a receiver 6044. The memory 608 is further configured to store an instruction 6082 and data 6084. In addition, the processor 602, the transceiver 604, the memory 608, and the I/O interface 610 are in communication connection by using the bus 612. The plurality of antennas 606 and the transceiver 604 are connected to each other.

The processor 602 may be a general purpose processor, for example, but not limited to, a central processing unit (CPU), or may be a dedicated processor, for example, but not limited to, a digital signal processor (DSP), an application-specific integrated circuit (ASIC), or a field programmable gate array (FPGA). In addition, the processor 602 may alternatively be a combination of a plurality of processors. Particularly, in a technical solution provided in this embodiment of the present invention, the processor 602 may be configured to perform, for example, step 310 in FIG. 3, and the operations performed by the generation module 410 in the network device 400 shown in FIG. 4. The processor 602 may be a processor specially designed for performing the foregoing steps and/or operations, or may be a processor that performs the foregoing steps and/or operations by reading and executing the instruction 6082 stored in the memory 608. The processor 602 may need to use the data 6084 in the process of performing the foregoing steps and/or operations.

The transceiver 604 includes the transmitter 6042 and the receiver 6044. The transmitter 6042 is configured to send a signal by using at least one of the plurality of antennas 606. The receiver 6044 is configured to receive a signal by using at least one of the plurality of antennas 606. Particularly, in a technical solution provided in this embodiment of the present invention, the transmitter 6042 may be specifically configured to perform, for example, step 320 in FIG. 3, and the operations performed by the sending module 420 in the network device 400 shown in FIG. 4, by using at least one of the plurality of antennas 606.

The memory 608 may be various types of storage mediums, for example, a random-access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 608 is specifically configured to store the instruction 6082 and the data 6084. The processor 602 may perform the foregoing steps and/or operations by reading and executing the instruction 6082 stored in the memory 608, and may need to use the data 6084 in the process of performing the foregoing steps and/or operations.

The I/O interface 610 is configured to: receive an instruction and/or data from a peripheral device, and output an instruction and/or data to the peripheral device.

It should be noted that, in a specific implementation process, the network device 600 may further include other hardware devices, which are not further listed in this specification.

Figure 7:
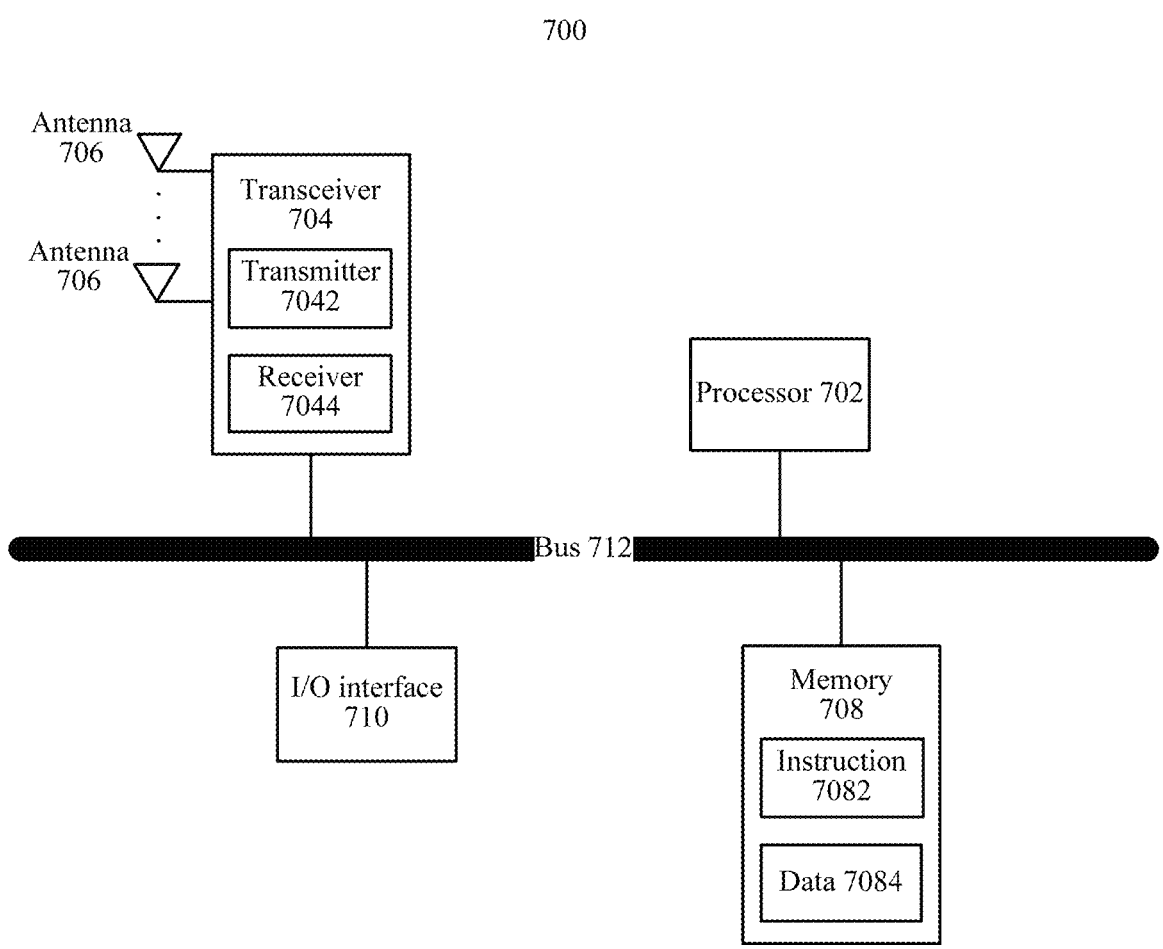
FIG. 7 is a schematic structural hardware diagram of a terminal device provided in an embodiment of the present invention.

FIG. 7 is a schematic structural hardware diagram of a terminal device 700 provided in an embodiment of the present invention. As shown in FIG. 7, the device 700 includes a processor 702, a transceiver 704, a plurality of antennas 706, a memory 708, an input/output (I/O) interface 710, and a bus 77. The transceiver 704 further includes a transmitter 7042 and a receiver 7044. The memory 708 is further configured to store an instruction 7082 and data 7084. In addition, the processor 702, the transceiver 704, the memory 708, and the I/O interface 710 are in communication connection by using the bus 77. The plurality of antennas 706 and the transceiver 704 are connected to each other.

The processor 702 may be a general purpose processor, for example, but not limited to, a central processing unit (CPU), or may be a dedicated processor, for example, but not limited to, a digital signal processor (DSP), an application-specific integrated circuit (ASIC), or a field programmable gate array (FPGA). In addition, the processor 702 may alternatively be a combination of a plurality of processors. Particularly, in a technical solution provided in this embodiment of the present invention, the processor 702 is configured to perform, for example, step 330 in FIG. 3, and the operations performed by the determining module 520 in the terminal device 500 shown in FIG. 5. The processor 702 may be a processor specially designed for performing the foregoing steps and/or operations, or may be a processor that performs the foregoing steps and/or operations by reading and executing the instruction 7082 stored in the memory 708. The processor 702 may need to use the data 7084 in the process of performing the foregoing steps and/or operations.

The transceiver 704 includes the transmitter 7042 and the receiver 7044. The transmitter 7042 is configured to send a signal by using at least one of the plurality of antennas 706. The receiver 7044 is configured to receive a signal by using at least one of the plurality of antennas 706. Particularly, in a technical solution provided in this embodiment of the present invention, the receiver 7044 may be specifically configured to perform, for example, the operations performed by the receiving module 510 in the terminal device 500 shown in FIG. 5, by using at least one of the plurality of antennas 706.

The memory 708 may be various types of storage mediums, for example, a random-access memory (RAM), a read-only memory (ROM), a non-volatile RAM (NVRAM), a programmable ROM (PROM), an erasable PROM (EPROM), an electrically erasable PROM (EEPROM), a flash memory, an optical memory, and a register. The memory 708 is specifically configured to store the instruction 7082 and the data 7084. The processor 702 may perform the foregoing steps and/or operations by reading and executing the instruction 7082 stored in the memory 708, and may need to use the data 7084 in the process of performing the foregoing steps and/or operations.

The I/O interface 710 is configured to: receive an instruction and/or data from a peripheral device, and output an instruction and/or data to the peripheral device.

It should be noted that, in a specific implementation process, the terminal device 700 may further include other hardware devices, which are not further listed in this specification.

This application further provides a communications system. The communications system includes any one of the foregoing network devices and any one of the foregoing terminal devices.

This application further provides a chip system. The chip system includes a processor, configured to support the foregoing network device in implementing a function related to the network device, for example, generating or processing data and/or information in the foregoing method embodiment. In a possible design, the chip system further includes a memory. The memory is configured to store a program instruction and data necessary to the network device. The chip system may include a chip, or may include a chip and another discrete device.

This application further provides a chip system. The chip system includes a processor, configured to support the foregoing terminal device in implementing a function related to the terminal device, for example, receiving or processing data and/or information in the foregoing method embodiment. In a possible design, the chip system further includes a memory. The memory is configured to store a program instruction and data necessary to the terminal device. The chip system may include a chip, or may include a chip and another discrete device.

It should be understood that all or some of the foregoing embodiments may be implemented by using software, hardware, firmware, or a combination thereof. When software is used to implement the embodiments, the embodiments may be implemented completely or partially in a form of a computer program product.

The computer program product includes one or more computer instructions. When the computer program instructions are loaded and executed on the computer, the procedures or functions according to the embodiments of the present invention are all or partially generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable mediums. The usable medium may be a magnetic medium (for example, a floppy disk, a hard disk, or a magnetic tape), an optical medium (for example, a DVD), a semiconductor medium (for example, a solid state disk (SSD)), or the like.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein.

In the specification, claims, and accompanying drawings of this application, the terms "first", "second", "third", "fourth", and so on (if any) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, system, product, or device.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A synchronization signal block indication method, wherein the method comprises:
    generating, by a network device, a synchronization signal block indication message, the synchronization signal block indication message comprising synchronization signal block group indication information and synchronization signal block indication information, the synchronization signal block group indication information being used to indicate a synchronization signal block group sent by the network device, the synchronization signal block indication information being used to indicate a synchronization signal block sent by the network device in each synchronization signal block group, and locations of synchronization signal blocks in synchronization signal block groups sent by the network device being the same; and
    sending, by the network device, the synchronization signal block indication message; and
    wherein the synchronization signal block group indication information comprises quantity information and configuration information of one or more synchronization signal block groups sent by the network device, the quantity information indicates a quantity m of synchronization signal block group(s) sent by the network device, and the configuration information indicates whether the one or more synchronization signal block groups sent by the network device are first m synchronization signal block group(s) or last m synchronization signal block group(s), and
    wherein the configuration information is 1 bit.

2. The method according to claim 1, wherein the synchronization signal block group indication information is bitmap information, and the bitmap information is used to indicate the synchronization signal block group sent by the network device.

3. The method according to claim 1, wherein the synchronization signal block indication information comprises quantity information and configuration information of the synchronization signal block sent by the network device, the quantity information is used to indicate a quantity n of synchronization signal block(s) sent by the network device in each synchronization signal block group sent by the network device, the configuration information is used to indicate whether the synchronization signal block(s) sent by the network device in each synchronization signal block group sent by the network device is a first n synchronization signal block(s) or a last n synchronization signal block(s) in the synchronization signal block group sent by the network device.

4. The method according to claim 1, wherein the synchronization signal block indication information is bitmap information, and the bitmap information is used to indicate the synchronization signal block sent by the network device in each synchronization signal block group sent by the network device.

5. The method according to claim 1, wherein the synchronization signal block group indication information is carried by using a master information block (MIB), and the synchronization signal block indication information is carried by using remaining system information (RMSI); or
   the synchronization signal block group indication information is carried by using RMSI, and the synchronization signal block indication information is carried by using an MIB; or
   the synchronization signal block group indication information and the synchronization signal block indication information are carried by using an MIB; or
   the synchronization signal block group indication information and the synchronization signal block indication information are carried by using RMSI.

6. A synchronization signal block determining method, wherein the method comprises:
   receiving, by a terminal device, a synchronization signal block indication message, the synchronization signal block indication message comprising synchronization signal block group indication information and synchronization signal block indication information, the synchronization signal block group indication information being used to indicate a synchronization signal block group sent by a network device, the synchronization signal block indication information being used to indicate a synchronization signal block sent by the network device in each synchronization signal block group sent by the network device, and locations of synchronization signal blocks in synchronization signal block groups being the same; and
   determining, by the terminal device based on the synchronization signal block indication message, the synchronization signal block group sent by the network device and the synchronization signal block sent by the network device in each synchronization signal block group sent by the network device; and
   wherein the synchronization signal block group indication information comprises quantity information and configuration information of one or more synchronization signal block groups sent by the network device, the quantity information indicates a quantity m of synchronization signal block group(s) sent by the network device, and the configuration information indicates whether the one or more synchronization signal block groups sent by the network device are first m synchronization signal block group(s) or last m synchronization signal block group(s), and
   wherein the configuration information is 1 bit.

7. The method according to claim 6, wherein the synchronization signal block group indication information is bitmap information, and the bitmap information is used to indicate the synchronization signal block group sent by the network device.

8. The method according to claim 6, wherein the synchronization signal block indication information comprises quantity information and configuration information of the synchronization signal block sent by the network device, the quantity information is used to indicate a quantity n of synchronization signal block(s) sent by the network device in each synchronization signal block group sent by the network device, the configuration information is used to indicate whether the synchronization signal block(s) sent by the network device in each synchronization signal block group sent by the network device is a first n synchronization signal block(s) or a last n synchronization signal block(s) in the synchronization signal block group sent by the network device.

9. The method according to claim 6, wherein the synchronization signal block indication information is bitmap information, and the bitmap information is used to indicate the synchronization signal block sent by the network device in each synchronization signal block group sent by the network device.

10. The method according to claim 6, wherein the synchronization signal block group indication information is carried by using a master information block (MIB), and the synchronization signal block indication information is carried by using remaining system information (RMSI); or
    the synchronization signal block group indication information is carried by using RMSI, and the synchronization signal block indication information is carried by using an MIB; or
    the synchronization signal block group indication information and the synchronization signal block indication information are carried by using an MIB; or
    the synchronization signal block group indication information and the synchronization signal block indication information are carried by using RMSI.

11. A apparatus, wherein the apparatus comprises:
    a processor, configured to generate a synchronization signal block indication message, wherein the synchronization signal block indication message comprises synchronization signal block group indication information and synchronization signal block indication information, the synchronization signal block group indication information is used to indicate a synchronization signal block group sent by a network device, the synchronization signal block indication information is used to indicate a synchronization signal block sent by the network device in each synchronization signal block group sent by the network device, and locations of synchronization signal blocks in synchronization signal block groups are the same; and
    a transceiver, configured to send the synchronization signal block indication message; and
    wherein the synchronization signal block group indication information comprises quantity information and configuration information of one or more synchronization signal block group sent by the network device, the quantity information indicates a quantity m of synchronization signal block group(s) sent by the network device, and the configuration information indicates whether the one or more synchronization signal block groups sent by the network device are first m synchronization signal block group(s) or last m synchronization signal block group(s), and
    wherein the configuration information is 1 bit.

12. The apparatus according to claim 11, wherein the apparatus is a chip.

13. The apparatus according to claim 11, wherein the apparatus is the network device.

14. An apparatus, wherein the apparatus comprises:
a transceiver, configured to receive a synchronization signal block indication message, wherein the synchronization signal block indication message comprises synchronization signal block group indication information and synchronization signal block indication information, the synchronization signal block group indication information is used to indicate a synchronization signal block group sent by a network device, the synchronization signal block indication information is used to indicate a synchronization signal block sent by the network device in each synchronization signal block group sent by the network device, and locations of synchronization signal block sent by the network device in synchronization signal block groups sent by the network device are the same; and
a processor, configured to determine, based on the synchronization signal block indication message, the synchronization signal block group sent by the network device and the synchronization signal block sent by the network device in each synchronization signal block group sent by the network device; and
wherein the synchronization signal block group indication information comprises quantity information and configuration information of one or more synchronization signal block group sent by the network device, the quantity information indicates a quantity m of synchronization signal block group(s) sent by the network device, and the configuration information indicates whether the one or more synchronization signal block groups sent by the network device are first m synchronization signal block group(s) or last m synchronization signal block group(s), and
wherein the configuration information is 1 bit.

15. The apparatus according to claim 14, wherein the apparatus is a chip.

16. The apparatus according to claim 14, wherein the apparatus is a terminal device.

* * * * *